(12) United States Patent
Gardner et al.

(10) Patent No.: US 6,483,087 B2
(45) Date of Patent: Nov. 19, 2002

(54) THERMOPLASTIC LAMINATE FABRIC HEATER AND METHODS FOR MAKING SAME

(75) Inventors: Alan D. Gardner, Stratford, CT (US); Andrew J. Miller, Bedford (GB); John A. Rolls, Armonk, NY (US); Jeff R. Parkin, Kent, CT (US)

(73) Assignee: Thermion Systems International, Stratford, CT (US)

(*) Notice: Subject to any disclaimer, the term of this patent is extended or adjusted under 35 U.S.C. 154(b) by 0 days.

(21) Appl. No.: 09/733,729

(22) Filed: Dec. 8, 2000

(65) Prior Publication Data
US 2002/0153368 A1 Oct. 24, 2002

Related U.S. Application Data
(60) Provisional application No. 60/170,016, filed on Dec. 10, 1999.

(51) Int. Cl.$^7$ ................................................. H05B 3/34
(52) U.S. Cl. ........................ 219/545; 219/529; 219/549; 338/208
(58) Field of Search ................................. 219/529, 544, 219/545, 549; 338/208

(56) References Cited

U.S. PATENT DOCUMENTS

| | | | |
|---|---|---|---|
| 3,657,516 A | 4/1972 | Fujihara et al. | 219/345 |
| 3,859,504 A | 1/1975 | Motokawa et al. | 219/345 |
| 3,898,427 A * | 8/1975 | Kevin et al. | 219/522 |
| 4,245,149 A | 1/1981 | Fairlie | 219/528 |
| 4,250,397 A | 2/1981 | Gray et al. | 219/345 |
| 4,534,886 A | 8/1985 | Kraus et al. | 252/502 |
| 4,734,231 A | 3/1988 | Morita et al. | 264/45.3 |
| 4,737,618 A | 4/1988 | Barbier et al. | 219/548 |
| 5,250,228 A | 10/1993 | Bairgrie et al. | 252/511 |
| 5,344,696 A | 9/1994 | Hastings et al. | 428/220 |
| 5,824,996 A * | 10/1998 | Kochman et al | 219/529 |
| 5,932,124 A | 8/1999 | Miller et al. | 219/213 |
| 5,942,140 A | 8/1999 | Miller et al. | 219/213 |
| 5,954,977 A | 9/1999 | Miller et al. | 219/201 |
| 5,966,501 A | 10/1999 | Miller et al. | 392/458 |
| 5,981,911 A | 11/1999 | Miller et al. | 219/387 |
| 6,015,965 A | 1/2000 | Miller et al. | 219/213 |
| 6,018,141 A | 1/2000 | Miller et al. | 219/221 |
| 6,057,530 A * | 5/2000 | Gurevich | 219/529 |
| 6,087,630 A | 7/2000 | Miller et al. | 219/213 |
| 6,145,787 A | 11/2000 | Rolls | 244/134 |
| 6,172,344 B1 * | 1/2001 | Gordon et al. | 219/529 |

FOREIGN PATENT DOCUMENTS

| | | |
|---|---|---|
| EP | 0505936 | 9/1992 |
| GB | 2285729 | 7/1995 |
| WO | 9515670 | 6/1995 |

OTHER PUBLICATIONS

Yalkowsky, S., Techniques of Solubilization of Drugs, Marcel Dekker, Inc., N.Y., 1981.

Alderman, D.A., Intl. J. Pharm. Tech. & Prod. Mfr., 5(3) 1–9, 1984.

* cited by examiner

Primary Examiner—Teresa Walberg
Assistant Examiner—Shawntina T. Fuqua
(74) Attorney, Agent, or Firm—White & Case LLP

(57) ABSTRACT

The invention relates to a laminated fabric heater element, heater and a process for manufacturing the heater element and heater. The heater comprises an electrically conductive fabric layer attached to bus bars, is sandwiched between two thermoplastic films forming a heater assembly. In the process making the heater element or heater, the layers of the heater assembly by consolidating the layers of films and fabric into a single sheet heater without the use of adhesive resins. The heater can be made of variable geometry, electrical supply voltage and power, and can withstand more mechanical, chemical, ultraviolet radiation and other environmental stresses than prior art heaters.

18 Claims, 8 Drawing Sheets

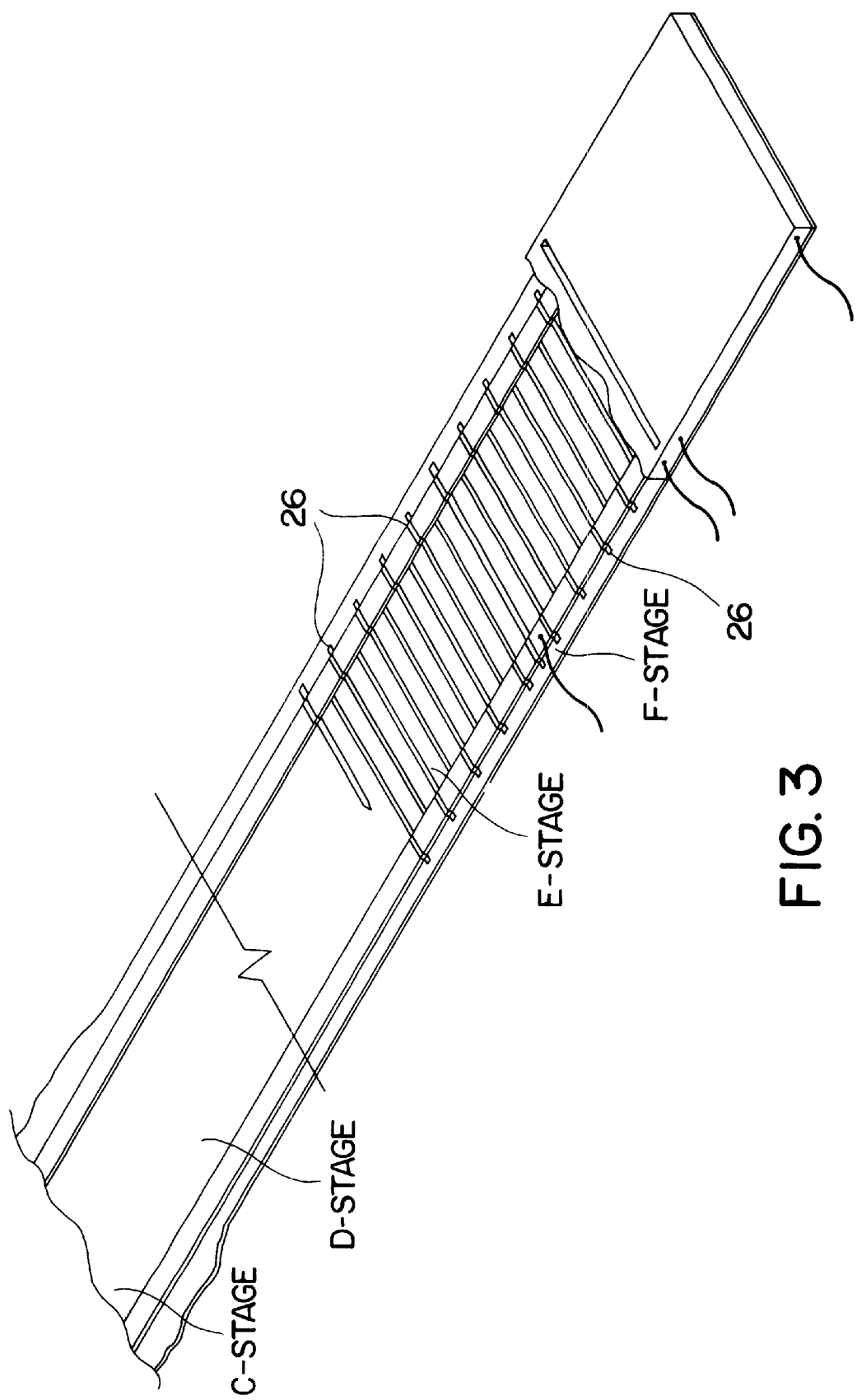

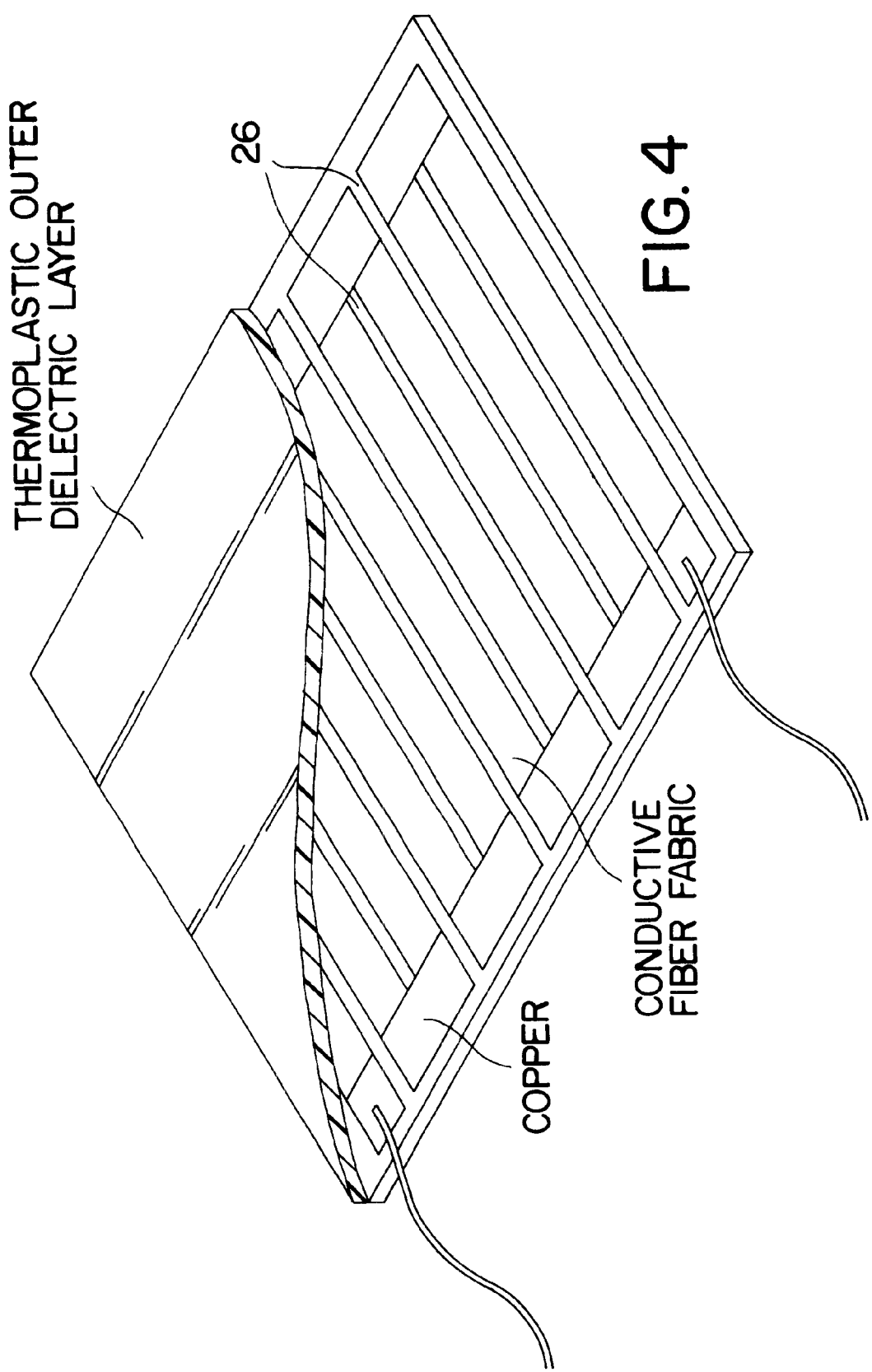

THERMOPLASTIC LAMINATE FABRIC HEATER AND METHODS FOR MAKING SAME

This application claims the benefit of 60/170,016, filed Dec. 10, 1999.

The invention relates to a heater element, a heater and a process for producing the heater element and heater. In particular, the heater comprises an electrically conductive fabric layer laminated between two layers of glass fiber-reinforced thermoplastic films. The heater further comprises bus bars and electrical leads, and it is produced by consolidating the layers of film and fabrics into a single sheet heater. The heater can be produced having variable geometry, electrical supply voltage and power. The heater of the invention is more durable than prior art heaters because it is able to withstand more mechanical, chemical, ultraviolet radiation and other environmental stresses than prior art heaters.

BACKGROUND

Laminate or film heater of the prior art have been made using metal foil, wires and electrically conductive fabrics laminated together using resins in between the layers to bond the integral layers together. Heaters manufactured from wire and foil have been used in industry for some time. In particular, such wire and foil heaters when used, for example, in the aerospace industry for deicing structures such as airplane wings and jet engine inlets, suffer from fatigue failure while in use, which considerably shortens their life when compared to fabrics. In addition, foil heaters, in particular, are expensive to produce and lack flexibility.

Because of their flexibility, light weight and even heat distribution characteristics, prior art laminate fabric heaters have been preferred in the art for many applications over metal foil heaters. In the aerospace industry, for example, fabric heaters are used for deicing structures such as airplane wings, jet engine inlets and antenna dishes, in the buildings industry for heating solid structures such as floors, countertops, pipes and tanks; in the food industry for heating food receptacles and in shipping industry and marine structures for preventing biofouling. See for example, U.S. Pat. Nos. 5,344,696; 5,925,275; 5,932,124; 5,942,140; 5,954,977; 5,966,501; 5,981,911.

Laminate fabric heaters of the prior art have been made with woven or non-oven fabrics containing fibers, which are electrically conductive fibers such as carbon fibers, and non-conductive fibers such as polyester. Non-conductive fibers for use in heaters are usually coated with a metal so that they can conduct the current via the metal coat, or the fibers are dispersed in a resin containing conductive particles, such as carbon black or iron particles. Conductive fibers can also be coated with a metal to improve their conductive properties.

Carbon fibers consolidated into a random, non-woven fabric or veil have been used in the art for shielding against electromagnetic interference. Conductive fabrics used in heaters for deicing and anti-icing aerospace structures are disclosed in, for example, U.S. Pat. No. 5,344,969 to Hastings et al. discloses an integrally bonded laminate that is used to thermally control a surface of an aircraft to which the laminate is bonded. The patent describes that the use of fabrics have numerous advantages over prior methods for deicing and heating airplane wings; for example, the conductive fiber is of low weight, and or permits nominal intrusion in terms of aerodynamics; it is easy to handle compared to wire and foil, and most notably, it allows the even distribution of heat. These factors contribute to a more efficient use of energy. Deicing and anti-icing aircraft applications necessitate an extreme in terms of product requirements. Because aircraft operate on very limited electrical resources and extreme atmospheric conditions, a system must be efficient as well as robust to provide protection. The patent also discloses, however, that the laminated fabric heater is manufactured using adhesive resins to bond the laminating layers together.

U.S. Pat. No. 4,534,886, to Kraus et al., discloses an electrically conductive web composed of a non-woven sheet of conductive fibers and non-conductive fibers. The sheet is saturated with a dispersion containing conductive particles and is then dried. The Kraus et al. heater element is used primarily in heating pads. The patent also discloses that the fabric heater layers are laminated together using an epoxy resin.

U.S. Pat. No. 5,925,275 to Lawson discloses an electrically conductive composite heating assembly. The assembly has an electrically conductive non-woven fiber layer laminated between layers of fiberglass and other dielectric material. The assembly further has an abrasion resistant outer layer. The heater element is used on aerospace structures as an ice protection system to withstand the repeated mechanical stress and thermal cycles encountered in extremely harsh aerospace environments. This patent also discloses that the fabric heater is manufactured using adhesive resins to bond the layers of the heater assembly.

Conductive fabric heaters disclosed in UK Patent Application No. 2,285,729 to Gerrard, are manufactured by baking a woven polymeric fabric to extreme temperatures in a multi-step process. The resultant fabric heater is limited by flexibility in resistance goals and furthermore lack variability of its Temperature Coefficients of Resistance. For example, the patent discloses that the fabric heaters are primary useful for low voltage source operation.

While laminated fabric heaters made using adhesive resins have been used with some success in the art, a disadvantage of using these type of heaters is due to the adhesive resins used. Adhesive resins used in making or bonding such laminated heaters must be cured and the process becomes time consuming and dangerous due to the toxicity of the materials involved. In addition, while adhesive resins are widely used to make laminated fabric heaters, the heat output from these type of heaters over a period of time dries the resin, leading to cracking of this layer and ultimately, the heater delaminates and loses function. Therefore, the art always seeks to develop new heaters or to improve the existing heaters. while adhesive resins are widely used to make laminated fabric heaters, the heat output from these type of heaters over a period of time dries the resin, leading to cracking of this layer and ultimate, the heater delaminates and loses function. Therefore, the art always seeks to develop new heaters or to improve the existing heaters.

In addition, heater designs as mentioned in Kraus, Hastings and Lawson suffer from expensive production methods and low operating temperatures. Machine setup is difficult to modify for different applications especially due to the use of epoxy and other resins, which have problems difficult to overcome; such as cost, shelf life, operating temperature and chemical limitations, long curing cycles and toxicity precautions. The addition of carbon black particles, polyaramid fibers (1), conductive adhesives (3), and multistage layer processing (2) contribute to the complexity and therefore the heater cost while limiting service temperature, suitability for complex designs, and high volume—low cost production.

SUMMARY OF THE INVENTION

The invention is directed to a laminated fabric heater element, a heater and a process for manufacturing the heater element and heater. The heater of the invention has many advantages over prior art heaters in that it is thin, flexible, produces more uniform temperature, has high fatigue life, and can be mass produced at less costs. In addition, the heaters of the invention can be operated at voltages ranging from millivolts to about 600 volts from either alternating current or direct current power supplies.

Specifically, the heater element comprises a consolidated electrically conductive fabric layer, two bus bars, and two thermoplastic layers; wherein each bus bar is contacting opposing edges of the conductive fabric layer and the consolidated electrically conductive fabric layer and the bus bars are sandwiched between the thermoplastic layers forming a single sheet.

The electrically conductive fabric layer of the laminated fabric heater of the invention may be selected from a variety of conductive fibers. However, in a preferred embodiment of the invention, the electrically conductive fabric layer comprises nickel-coated carbon fibers.

The laminated fabric heater element can further be attached to electrical leads at bus bars to form the heater. The bus bars of the laminated heater can be made of various material such as copper, brass or silver foils. In a preferred embodiment, however, the bus bars are made of copper foils.

In another embodiment, the laminated fabric heater of the invention can further comprises a glass veil disposed on the outer surfaces of the thermoplastic layers for additional reinforcement depending on the requirements for the heater application before the heater is formed into a single sheet.

In the heater of the invention, the thermoplastic films can be obtained from commercially available sources. While any thermoplastic film can be used, the heaters of the invention are preferably manufactured with polyetherimide, polyetheretheketone, polyethersulfone, polysulfone polyvinylidine fluoride, acetobutylstyrene, polyphenylene oxide and polyamide.

The laminated fabric heater can further comprises cuts perpendicular to and through at least one of the bus bars in a zig-zag pattern for creating a circuit and to increase the resistance of the heater to a desired value depending on the application.

In another embodiment, the laminated fabric heater of the invention further comprises an outer layer of thermoplastic or silicon rubber for increasing the dielectric strength of the heater.

The process for making the laminated fabric heater of the invention is as follows: A first thermoplastic layer on a surface where the heater is to be assembled. A layer of the electrically conductive fabric is disposed on the first thermoplastic layer. Bus bars, preferably made of copper foil are disposed on opposing edges of the electrically conductive fabric layer so that the bus bars are in contact with the electrically conductive fabric layer and are parallel to one another. Once the bus bars are in contact with the conductive fabric, they can be attached to the conductive fabric by piercing a hole through the bus bar and fabric using a piercing rivetor apparatus. The action of piercing causes the metal displaced to form a hole to curl and flatten under the fabric, thereby securing the bus bars to the fabric. Thereafter, a second thermoplastic layer is disposed on the electrically conductive fabric layer and bus bars to form a heater assembly. Once the heater layers are assembled, the heater assembly is heated at suitable temperatures to a set thickness to consolidate the conductive fabric layer sandwiched in the thermoplastic film layers, thereby forming a single sheet heater. After consolidation of the layers, and specially of the conductive fabric layer, the heater is transferred to a cooling chamber to quench the heater at its maximum consolidation state. A glass fiber reinforcement layer can be disposed on the outer surfaces of the thermoplastic layers prior to consolidation and depending on the heater output requirement.

While the process described above can be performed at a small scale to produce a small number of small heaters using a hydraulic press, the process can be adapted for manufacturing heater elements and heaters in high volume using a roller laminating apparatuses. In roller lamination, the heater element is produced in a single long sheet of indefinite length and width, which length and width are only limited by the length and width of the starting materials and machinery used. The heater element made through roller lamination can be stored in rolls, and heaters can be made from segments of the heater element as required. In this embodiment of the invention, the process comprises combining a layer of electrically conductive fabric from a roll supply with two metal foil bus bars, wherein the bus bars are positioned parallel to one another at opposing edges of and contacting the conductive fabric in the direction of the roll. The bus bars are secured to the conductive fabric by making a hole in the conductive fabric and bus bar by piercing both components in a piercing rivetor apparatus as described above. Once the bus bars are secured to the fabric, the conductive fabric layer containing bus bars are drawn between tow layers of thermoplastic films forming a sandwich type structure assembly. The heater assembly sandwich is then fed through a pinch roller, which had been preheated at a predetermined temperature and set at a predetermined pressure to cause gelling of the thermoplastic layers. The gelling of the thermoplastic layer causes some of the thermoplastic to flow through the conductive fabric, fusing the films and consolidating the conductive fibers into a single sheet heater element. Once consolidation occurs, the resultant single sheet fabric heater is drawn over a cooling chamber so that maximal consolidation of the layers is maintained. Individual heaters can be made by cutting a section from the heater sheet roll with a tooling die or a water jet cutter, attaching electrical leads by ultrasonic welding and laminating it once more with a layer of thermoplastic, thereby maintaining the gap cut by the die or water jet and providing a final dielectric layer.

BRIEF DESCRIPTION OF THE DRAWINGS

FIG. 3 is a schematic representation of the heater at various stages of manufacturing through the roller laminating process.

FIG. 4 is a schematic drawing illustrating a cut away view of the heater of the invention showing the cuts through the heater in a zig-zag pattern.

DETAILED DESCRIPTION OF THE INVENTION

Figure 1:
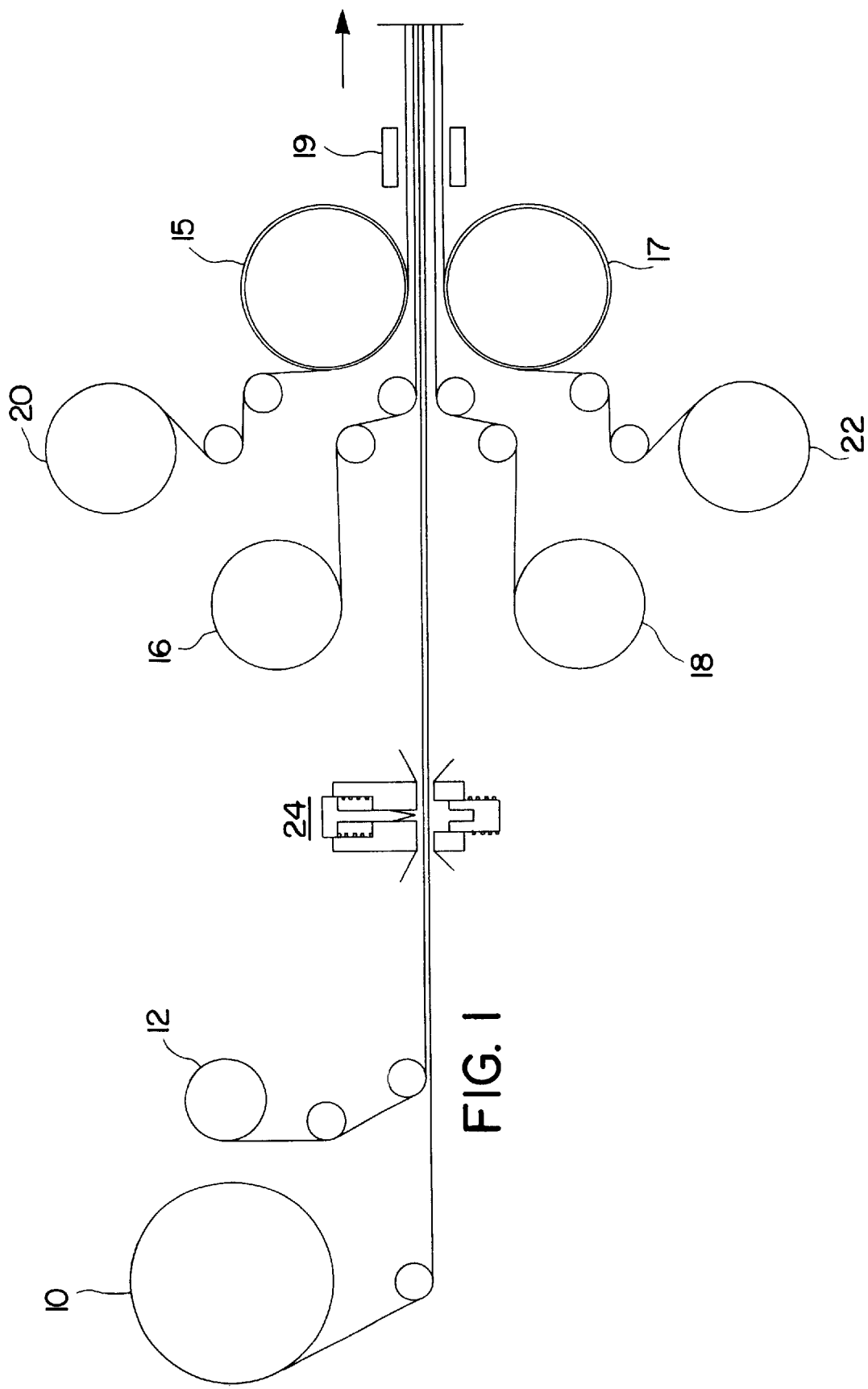
FIG. 1 is a schematic diagram of the process for making the laminated fabric heaters of the invention in a roller laminating apparatus.

The heater element of the invention comprises a layer of conductive fabric, two bus bars positioned at opposing edges of the fabric sandwiched between two outer layers of thermoplastic. The conductive fabric can be made from various materials, which are known in the art and comprises electrically conductive fibers. In a preferred embodiment, the conductive fabric comprises electrically conductive fibers, and more preferred carbon fibers, in particular, nickel-coated carbon fibers. In this embodiment, the conductive fibers are chopped fibers and are converted into a non-woven conductive fabric using paper making techniques. An organic binder is used to hold the fibers together in the fabric. The thickness, density, fiber, coating and predominant fiber direction of the fabric all determine the final resistivity of the heater. Depending on the size of the heater and power output required, the appropriate length of fabric layer can be cut from a supply roll or an entire roll can be used for mass producing the heater elements. In a preferred embodiment of the invention, the electrically conductive fabric layer is consolidated. A consolidated conductive fabric layer results from the consolidating step during the laminating process.

Consolidation is a process by which the thermoplastic layers of the heater are brought to a gelling state under pressure during bonding of the heater and to a predetermined thickness, this causes the electrically conductive fibers of the conductive fabric to be brought into intimate contact with one another through the laminating process.

Carbon filaments are manufactured from a polymer fiber under high temperature and pressure within an inert environment. The fibers can be coated with a metal, such as nickel, brass, silver or other suitable metal or a combination thereof, by one of several processes, tailoring the Temperature Coefficient of Resistance (the rate at which the electrical resistance of a medium changes as a result of a change in temperature) and resistivity of the final fabric. Fibers are combined into a tow and chopped to a desired length between about 3 millimeters and 12 millimeters or longer. Fiber length is a major factor in determining the fabric's resistance, flexibility, and structural conformity and heat uniformity.

The thermoplastic films for use in the heater of the invention can be of various types and are commercially available. In a preferred embodiment, the thermoplastic films are polyetherimide (Ultem®, Westlake Plastics, Inc., Pa.), polyetheretheketone (Victrex®, Westlake Plastics, Inc. Pa.), polyamide (Kapton®, E. I. Dupont de Nemours, Del.), polyethersulfone, sulfone, polyvinylidine fluoride (Kynar®, PVDF, Westlake Plastics, Inc., Pa.), acetobutylstyrene (Cycolac, ABS, Westlake Plastics, Inc., Pa.), polyphenylene oxide (Noryl®, Westlake Plastics, Inc., Pa.) and the like. Thermoplastic films have different gelling temperatures. Therefore, in the process of the invention, the temperature at which the pinch rollers or hydraulic press is set is determined by the type of thermoplastic film used. In the process of manufacturing the heaters of the invention, Ultem® is used at a temperature of approximately 275° C., and Vitrex® is used at 350° C.

The process and the heater element and heater of the invention can be described with references to the figures. FIG. 1 illustrates the high volume production process useful for making the laminated fabric heaters of the invention. As seen in FIG. 1, the process involves a roller laminating apparatus. The starting materials are all provided in rolls, i.e., the conductive fabric 10, the bus bar strips 12, 14, the thermoplastic film 16, 18, and as needed, the glass fiber veil 20, 22.

As shown in FIG. 1 in a roll stack operation, the conductive fabric and copper foil, or other suitable metal, are laminated in glass fiber-reinforced thermoplastic film, feed wires are attached and the whole heater finally encapsulated. In a preferred embodiment, the process starts with a roll of conductive fabric 10, two rolls of thermoplastic film 16, 18, two rolls of copper foil 12, 14, and two rolls of glass fiber veil 20, 22. The conductive fabric 10, pulled from a roll, is combined with copper foil 12, 14, and 2 mils in thickness, separated by some predetermined distance and applied parallel to each other, contacting the conductive fabric, and in the same direction of the conductive fabric roll 10, although other orientations are possible. Preferably the copper foil bus bars near the free edges of the roll.

The copper foil bus bars 12, 14 and conductive fabric 10 are drawn together through a piercing rivetor 24, whereby perforated upper and lower support plates maintain fabric and copper foil bus bars 12, 14 in proximity and a pin like tapered needle of small dimension, compared to the width of the copper, is pressed through the copper foil and conductive fabric. The needle is withdrawn and the area around the pierced hole is compressed. Compression may take the form of a roller or pair of rollers or a press rod fixture clamping from both sides. The action of piercing the copper splits the copper into several petals, much like a flower. As the taper of the needle continues into the opening the petals are curled over, moving away and entrapping local fibers. Once compressed the fibers are permanently held and the copper is securely attached to the fabric. This portion of the process is optional, but adds in locating the copper.

From the pierce/riveting action of the copper foil bus bars the final products are ready for the first lamination using the thermoplastic films 16, 18. The conductive fabric 10, with the copper foil bus bars attached, are drawn between the two layers of thermoplastic film 16, 18 which is slightly wider (by about 1 to 6 mm) than the conductive fabric 10. To facilitate wire attachment to the copper foil bus-bar the top layer of thermoplastic film 16 may be perforated prior to the first lamination process. Over and outside the thermoplastic film, glass fiber veil 20, 22 are added to both sides of the laminate stack.

Figure 2A:
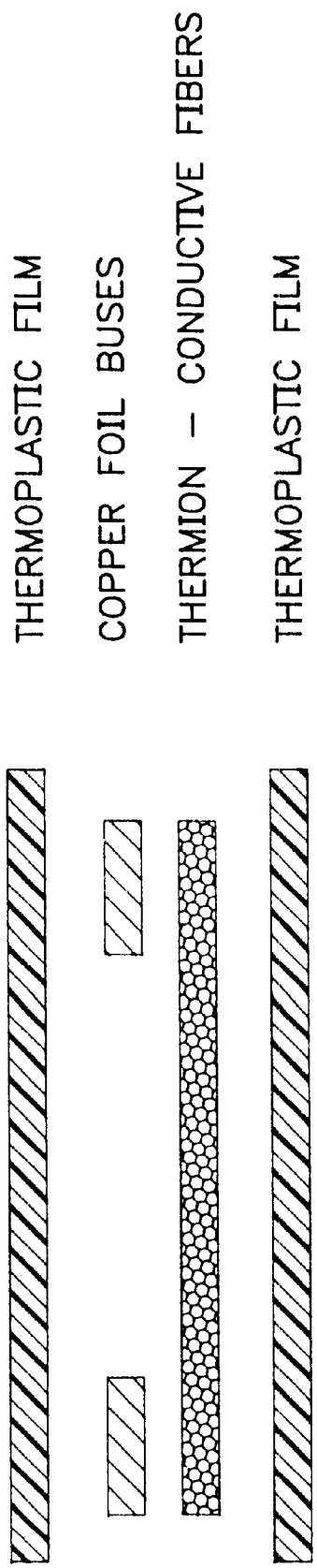
FIGS. 2A and 2B are cross-sections of the heater element of the invention showing the various layers prior to consolidation without and with glass fiber veil respectively.
Figure 2B:
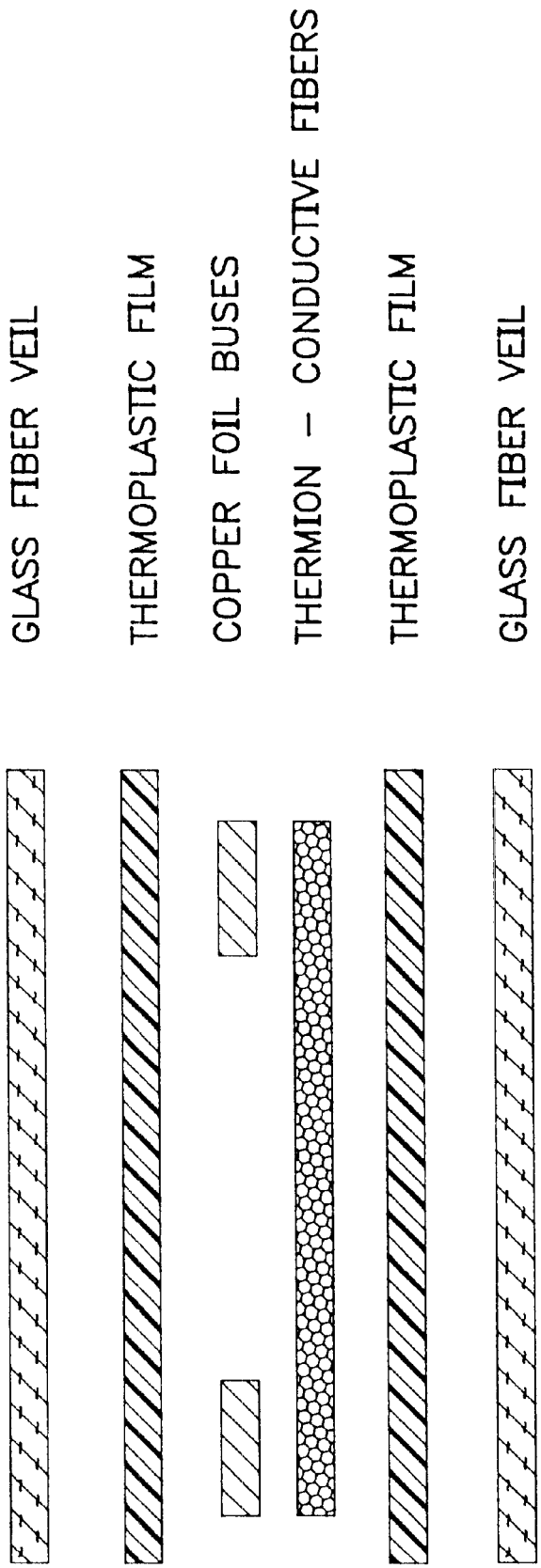

The conductive fiber layer with copper foil bus bars, sandwiched in the thermoplastic films with or without a fiberglass veil, as shown in the cross-section in FIG. 2, are drawn together through pinch rollers 15, 17, which have been preheated at a predetermined temperature and set at a predetermined distance depending on the type and thickness of thermoplastic film and fabric used. The layers of dry materials are heated and fused together by pinch rollers into a consolidated sheet of exact thickness. Temperatures and pressures are such that the thermoplastic heats sufficiently to flow through the conductive fabric, pierced copper bus and glass fiber veil. The pinch roller separation is set to achieve proper consolidation of the sheet and most importantly the conductive fabric. Once consolidated, the conductive fabric will achieve its final resistivity. For any given combination of conductive fabric, thermoplastic film, and glass fiber veil experimentation has shown that consolidation must always be compressed to at least 110% of the thermoplastic film thickness. When the first lamination process is complete the product can be graded and stored for future use or further processed into cut heaters of predetermined design. Once consolidated, the sheet heater is transferred to a cooling chamber 19 to maintain maximal degree of consolidation.

To increase the resistance of the heater, perpendicular cuts 26 can be made through the laminate through at least one of the bus bars, as shown in FIG. 3. This can be done from stock or during the running process after cooling the sheet heater. The continuous laminated sheet is pulled through a cutting or slitting device. The device could be a die cutter made to the desired shape, or a dynamic cutter such as a water jet or laser cutter which are commercially available. With the necessary cutting tool a circuit pattern such as a serpentine or zig-zag can be cut thereby further increasing the resistance to the desired value, by increasing the electrical path. A first cut is made from outside copper edge to outside copper edge but within the maximum width of the thermoplastic layers. Cuts 26 such as this define a starting and stopping edge. Additional cuts in an alternating fashion across the roll from inside copper edge to outside copper edge, and at specified distances from each other down the roll form a circuit by which electrical current can be made to travel in this zig-zag pattern (see FIG. 4). These cuts also terminate short of the thermoplastic layer edge. Lastly a cut, in a similar manner to the first cut, is made which defines the final width of that circuit. Using the last cut as the first cut for the next series, the pattern process can continue for the entire laminated heater roll. To vary the circuit design, the intermediate cuts, those that alternate, can be made at different spacing, as narrow a 4 mils or as wide as the design requires. Varying the spacing within one design allows the designer to vary the heat output for each strip within the circuit. Cuts short of the thermoplastic edge essentially frame the circuit, holding the strips in place while wires are attached and final lamination is completed.

Figure 5:
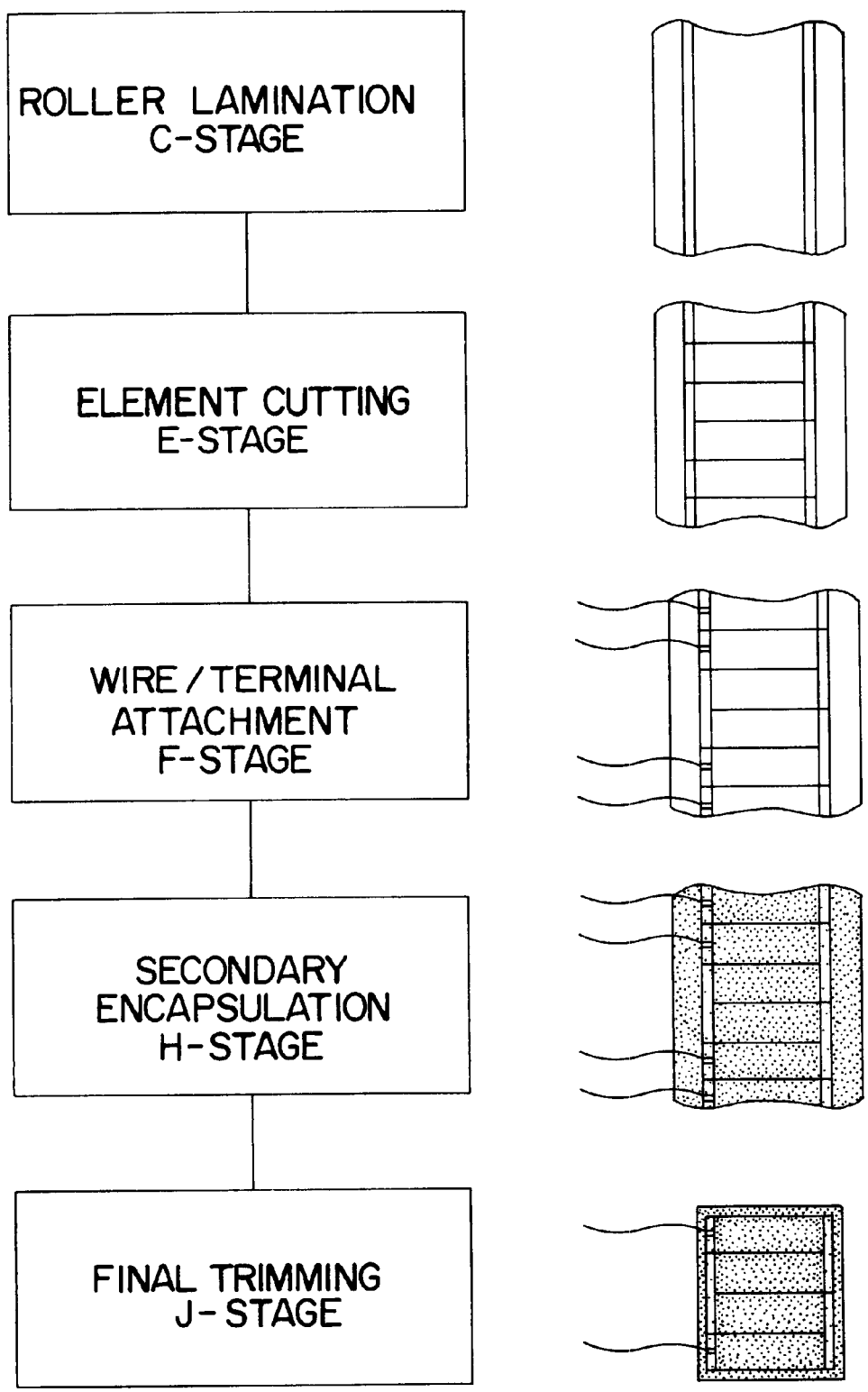
FIG. 5 is a schematic diagram showing the various stages C, E, F, H and J of the process of manufacturing the heater of the invention.
Figure 6:
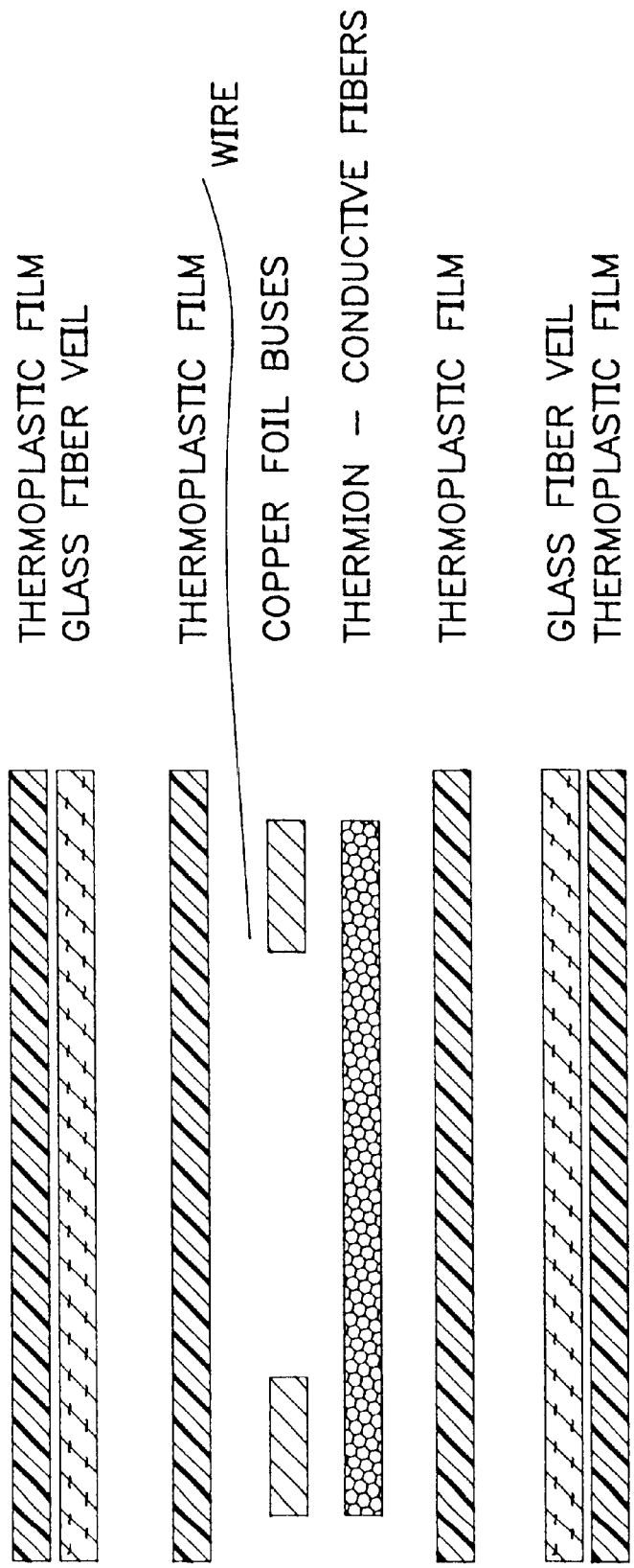
FIG. 6 is a schematic drawing of the heater of the invention shown in cross-section.

FIGS. 3–5 illustrate how circuits of even or odd number of strips can be created and thus affect wire placement. For even numbered-strip circuits wire attachment for each heater would be made on one side. For odd numbered-strip circuits the wires would be attached at opposite sides. Electrical leads in the form of wires can be attached to the copper foil bus through the thermoplastic or perforations within the thermoplastic and at the location defining the beginning and end of the zig-zag pattern. Attachment would be accomplished by currently know methods such as solder, brazing, ultrasonic welding or crimping, and catered to the temperature, and electrical application requirements of the heater.

FIGS. 3–6 also show that once wires leads are attached, the heater is finally encapsulated to hold the element strips in place, increase the dielectric strength of the heater, and protect the circuit and wire attachment points. In a preferred method, the final encapsulating layer can either be additional thermoplastic layers, or other suitable dielectric materials, such as silicone rubber. If thermoplastic films are used as the encapsulating layers, then the continuous, laminated heater sheet is drawn into another roll stack laminating machine where one additional layer of thermoplastic is fused to each side of the circuit, encapsulating the circuit and wire attachment points. An extra layer of thicker thermoplastic film may be added to the laminate stack at the same time to locally reinforce the heater around the wire attachment points. The top roller should be coated with a layer of heat resisting rubber, e.g. silicone rubber, to enable the top thermoplastic film to be encapsulated over the top of the raised wire attachment points.

FIG. 5 illustrates also the final cutting stage of the process. Depending on the application and size of heater required, transverse cuts are made through the sheet product to separate the heaters from each other. As in the circuit cutting stage, this can be achieved using die cutting techniques, water jet or laser cutting methods.

Figure 7:
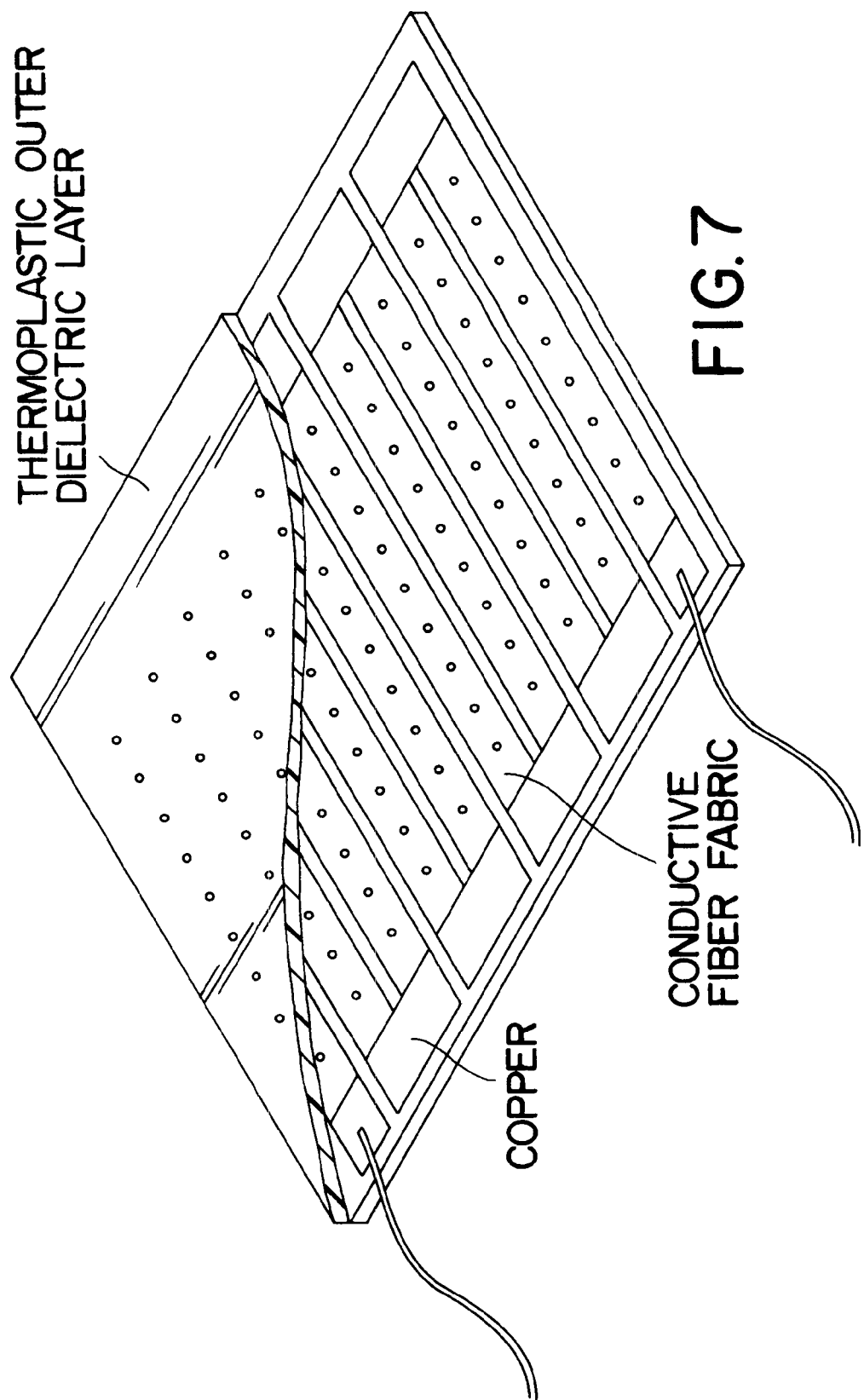
FIG. 7 is a schematic diagram illustrating a heater of the invention in which holes are perforated through the laminate.

To further increase the resistance and/or facilitate encapsulation into another medium, holes can be perforated at predetermined locations within the laminate as shown in FIG. 7. If perforations are provided in the laminate heater to facilitate encapsulation, additional layers of thermoplastic film or silicone rubber are added with perforations, or added after the second encapsulation is complete. Perforations of the second layers are of slightly smaller dimensions, provided there is a need for a dielectric layer around the opening.

The heaters of the invention can be used in multiple applications depending on the heat requirements. Power can be delivered by means of single-use batteries, rechargeable batteries, power adapters, and generator derived systems such as wall supply, portable generators, solar energy and industrial transformers. Examples of the heaters of the invention is some low voltage applications, from millivolts to about 5 volts include, novelty gift items such as heated cards, coasters and eye mask; toys such as kitchen sets; electronic sensors for heating and deicing; personal rechargeable appliances such as hair curlers, and personal warmers such as ear muffs, gloves, socks, hats and the like.

Heater applications requiring medium voltage from about 6 to 28 volts include, for example, car parts and accessories such as floor mats, steering wheel, seats, door panel and mirror defrosters; motorcycle grips, mirrors, seat pad, tank and helmets; aircraft wings, propellers, floors, seats, instruments, controls, interior panels, galley and lavatory seats; in boats including ferry seats, deck, railings, galley and lavatory; warming counter and waste tanks in recreational vehicles; in other applications including, solar powered heating panel, pillows, electrical component/cabinet heaters, food preparation applications.

Heater applications requiring high voltage from about 110 to about 250 volts single phase, include, for example, aircraft wings, propellers, rotors, cowlings, inlets; household items such as appliances, room heaters (wall and floor), countertop warmers, firewood reheater/drier, walkways, driveways, steps, antenna pillows, food preparation; and commercial/industrial goods such as liquid drum heaters, ovens, shop space, machine processes, tools/dies, and the like. Heater applications requiring the highest voltage, from about 208 to 600 volts mutiphase, include, commercial/industrial goods such as liquid drum (band) heaters, ovens, shop space, machine processes, tools/dies, transmitter/receiver of reflector antennas, electrical (signal) relay/component cabinets; large commercial and military aircrafts heaters for deicing parts, and the like.

EXAMPLE 1

Construction of a Business Card Sized Novelty Heater by Batch Processing for Small Quantities The heater will have 4 strips of 11.38 mm width, produce 2.88 watts of power from 24 volts and deliver 0.08 watts per square centimeter at room temperature. Maximum temperature in air would be approximately 120° C. All the necessary materials are cut to the appropriate dimensions. Four thermoplastic films, preferably Polyetherimide (PEI) of 75 microns thickness, and glass fiber veil of 20 grams per square meter are cut to 91 mm×53 mm. Additionally, the glass fiber veil for the top is cut to 79 mm×57 mm. Two soft copper foil strips of 50 micron thickness to 3 mm×57 mm are prepared, removing any sharp edge by smoothing with a hand-held roller.

From a roll of conductive veil with the following properties (5% nickel coated carbon, 6 mm fiber and 8 grams per square meter, having a surface resistivity of 6.7 ohms/sq, such as that provided by Thermion Systems International, Stratford, CT and known as THERMION) a piece is cut off the end of the roll 53 mm wide, assuring the cut is made as parallel to the axis of the roll as possible. One end is trimmed off square and a piece 85 mm long is cut from the strip.

On a suitable metal support plate of 4 times the part's size and of smoothness to 2 microns, such as laminate press plate, the smooth surface is treated with release agent such as dry Teflon lubricant to add in removal of the completed part once consolidation and cooling are achieved. After application of the release agent buff the surface to remove any excess material. The larger of the two glass fiber veils is placed on the treated surface, leaving sufficient clearance to the edges of the plate. One of the cut PEI films is disposed on top of the glass fiber veil in a similar orientation.

The conductive fabric is prepared by orienting the copper foil at opposite ends of the 85 mm length, overlaying the copper onto the fabric. The copper foils are centered at the end allowing it to extend evenly beyond the width of and contacting the conductive fabric. This aids in maintaining the proper separation of the copper and eliminate the possibility of the copper shifting during assembly of the heater layers. Over a small hole of 1 mm made in a flat plate such as plastic, pierce through the copper foil and conductive fabric with a small needle at the four corners of the fabric; approximately 1 mm in from each corner. This is repeated for each corner. The fabric is turned over onto a hard clean surface with the copper side down. With a short flat ended rod, the area is lightly compressed, thereby completing the piercing process. This compression will hold the copper to the fabric during consolidation.

The conductive fiber fabric is placed with the attached copper foil onto the layers of glass fiber veil and thermoplastic film already placed on the support plate. The conductive fabric with copper side up is centered into the other layers. At the extreme ends of the copper strips, the last 1 to 2 mm is gently and slightly bent upward by 30 to 45 degrees. This helps align the top layer of glass fiber. The second thermoplastic film layer is disposed over the conductive fabric followed by the top glass fiber veil layer. The veil between the copper tips that were previously bent up is align and center.

At opposite side of the laminate or preferably around the laminate, several 150 micron shims are placed. Alternatively a shim in the form of a frame can be fashioned to encompass the laminate. Over the laminate and shims, a second laminate plate is placed which has been treated with release agent. The stack is placed into a hydraulic press with platens preheated to 275° C. Compress the stack with 900 metric tons applied load for 3 minutes. The laminate stack is cooled to 200° C. while maintaining the load. Once the temperature is reduced, the load and the stack are removed from the press. The plates are separated and the consolidated part is removed, allowing it to cool to room temperature. The long edges of the consolidated part (heater) are trimmed square to the copper to 47 mm wide, removing the portions of the copper that were pierced. Additionally, the ends past the copper are trimmed to achieve a part dimension of 47 mm×89 mm, leaving 2 mm of PEI beyond the copper.

Using a die cutter set to the correct dimensions or a water jet cutting machine, the element gaps are cut to create the element strips. Each gap is 0.5 mm wide running down the length of the conductive fabric and through the copper foil at one end stopping short of the part's edge. The machine only cuts one copper foil bus per gap, alternating which bus (left or right) it cuts as the machine creates each strip. From the 47 mm wide laminate 3 cuts are made, resulting in strips of approximately 11.38 mm wide. This pattern creates an electrical path of 3×79 mm or 237 mm.

Using an ultrasonic wire welding device, one wire is attached through the thermoplastic to each of the two copper foil busses that measure 3 mm×11.38 mm. Note that these are the two end strips where the electrical path starts and stops. The consolidated and cut heater is placed over another layer of PEI film and onto the laminate plate. Again, another layer of PEI film is disposed over the part and cover with a high temperature silicone rubber sheet of approximately 1 to 5 mm. The top laminate plate is replace inserted into the preheated press at 260° C. for an additional 5 minutes. The press is cooled to 200° C. and the part is removed. The edges are trimmed to 89 mm by 51 mm leaving 2 mm for dielectric and the consolidated heater is dressed or completed.

We claim:

1. A laminated fabric heater, comprising a consolidated electrically conductive fabric layer, two bus bars, and two thermoplastic layers; wherein each bus bar without an adhesive is contacting opposing edges of the conductive fabric of the consolidated electrically conductive fabric layer, and the bus bars are sandwiched between the thermoplastic layers forming a fused single sheet.

2. The laminated fabric heater according to claim 1, wherein the consolidated electrically conductive fabric layer comprises nickel-coated carbon fibers.

3. The laminated heater according to claim 1, further comprising electrical leads attached to the bus bars.

4. The laminated heater according to claim 3, wherein the bus bars are made of copper foil.

5. The laminated fabric heater according to claim 1, further comprising a first glass veil disposed on the outer surface of the first thermoplastic layer and a second glass veil disposed on the outer surface of the second thermoplastic layer prior to forming the heater into a fused single sheet.

6. The laminated fabric heater according to claim 1, wherein the thermoplastic layers are thermoplastic films selected from the group consisting of polyetherimide, polyetheretherketone, polyethersulfone, sulfone, polyvinylidine fluoride, acetobutylstyrene, polyphenylene oxide and polyamide.

7. The laminated fabric heater according to claim 1, further comprising cuts perpendicular to and through at least one of the bus bars in a zig-zag pattern for creating a circuit and to increase the resistance of the heater to a desired value.

8. The laminated fabric heater according to claim 3 or 7, further comprising an outer layer of thermoplastic or silicon rubber for increasing dielectric strength of the heater.

9. The laminated fabric heater according to claim 1, further having perforations through the laminate.

10. A process for making the laminated fabric heater of claim 1, comprising:
   disposing a first thermoplastic layer on a surface;
   disposing a layer of electrically conductive fabric on the first thermoplastic layer;
   disposing bus bars without an adhesive at opposing edges of the electrically conductive fabric layer so that the bus bars are in contact with the electrically conductive fabric layer;
   disposing a second thermoplastic layer on the electrically conductive fabric layer and bus bars;
   heating the heater at suitable temperatures under pressure to consolidate the conductive fabric; and
   transferring the heater to a cooling chamber so that maximum consolidation is maintained.

11. A process for manufacturing the heater according to claim 1 in a roller lamination apparatus, comprising:

combining a layer of electrically conductive fabric from a roll supply with two metal foil bus bars, wherein the bus bars are parallel to one another and are placed at opposing edges of and contacting the conductive fabric in the direction of the roll;

securing the bus bars to the conductive fabric by making a hole in the conductive fabric and bus bar in a piercing rivetor;

drawing the conductive fabric layer containing bus bars between two layers of thermoplastic film forming a sandwich structure;

feeding the sandwich structure through a pinch roller preheated at a predetermined temperature and thickness to cause gelling of the thermoplastic layers; consolidating the conductive fiber layer to form a single sheet heater; and cooling the single sheet heater in a cooling chamber.

12. The process according to claim 10 or 11, further comprising providing a glass fiber-reinforcement layer on the thermoplastic layers prior to feeding the sandwich structure through the pinch roller.

13. The process according to claim 10 or 11, further comprising attaching electrical leads to bus bars.

14. The process according to claim 10 or 11, further comprisng cutting the heater perpendicular to and through at least one of the bus bars to create circuit of variable power output.

15. The process according to claim 10 or 11, further comprising laminating at least one thermoplastic layer on opposing surfaces of the heater.

16. The process according to claim 10 or 11, further comprising perforating the laminate to create holes.

17. The process according to claim 16, further comprisng attaching an additional layer of thermoplastic or silicon rubber to the laminate.

18. The process of claim 10 or 11, further comprising attaching the electrical leads wires to the bus bars through one of the thermoplastic layers.

* * * * *